United States Patent
Yonemori et al.

(10) Patent No.: US 7,940,018 B2
(45) Date of Patent: May 10, 2011

(54) CONTROL SYSTEM FOR A HYBRID ELECTRIC VEHICLE AND A METHOD FOR CONTROLLING A HYBRID ELECTRIC VEHICLE

(75) Inventors: Kei Yonemori, Hiroshima (JP); Nobuhide Seo, Hiroshima (JP); Kohei Saito, Higashihiroshima (JP); Hirofumi Akagi, Kawasaki (JP); Hideaki Fujita, Yokohama (JP)

(73) Assignee: Mazda Motor Corporation, Hiroshima (JP)

( * ) Notice: Subject to any disclaimer, the term of this patent is extended or adjusted under 35 U.S.C. 154(b) by 505 days.

(21) Appl. No.: 12/144,587

(22) Filed: Jun. 23, 2008

(65) Prior Publication Data
US 2008/0315817 A1     Dec. 25, 2008

(30) Foreign Application Priority Data

Jun. 25, 2007   (JP) ................................ 2007-166655
Dec. 20, 2007   (JP) ................................ 2007-328854

(51) Int. Cl.
*H02P 3/14*     (2006.01)
*H02P 3/18*     (2006.01)
(52) U.S. Cl. ........ 318/376; 318/139; 318/141; 318/152; 318/476; 180/65.1; 180/65.21; 701/22
(58) Field of Classification Search .................. 318/139, 318/144, 151, 376, 476; 701/22; 180/65.1, 180/65.21
See application file for complete search history.

(56) References Cited

U.S. PATENT DOCUMENTS

| | | | |
|---|---|---|---|
| 6,026,921 A | | 2/2000 | Aoyama et al. |
| 6,784,563 B2 * | | 8/2004 | Nada .......................... 290/40 C |
| 7,237,634 B2 * | | 7/2007 | Severinsky et al. ........ 180/65.23 |
| 7,440,827 B2 * | | 10/2008 | Kawada et al. ................. 701/22 |
| 2007/0137908 A1 | | 6/2007 | Fujiwara et al. |
| 2008/0315803 A1 * | | 12/2008 | Yonemori et al. ............ 318/148 |
| 2009/0309537 A1 * | | 12/2009 | Saito ............................ 320/101 |

FOREIGN PATENT DOCUMENTS

| | | |
|---|---|---|
| EP | 0959552 | 11/1999 |
| EP | 1199205 | 4/2002 |
| EP | 1864847 | 12/2007 |
| WO | 2005/105511 | 11/2005 |

OTHER PUBLICATIONS

ISA European Patent Office, International Search Report of EP08011355, Jan. 9, 2009, 1 page.

* cited by examiner

*Primary Examiner* — Bentsu Ro
*Assistant Examiner* — Erick Glass
(74) *Attorney, Agent, or Firm* — Alleman Hall McCoy Russell & Tuttle LLP

(57) ABSTRACT

A control system and method for a hybrid electric vehicle. One example control system includes a current calculating module to calculate a current, the current being at least one of a current to drive a motor of the vehicle and a current generated by the motor, and a feed controller to selectively implement a first mode when the calculated current is below a predetermined current value and to selectively implement a second mode when the calculated current is more than the predetermined current value, wherein either the first feed circuit or the second feed circuit is used in the first mode and both the first feed circuit and the second feed circuit are used in the second mode.

12 Claims, 15 Drawing Sheets

CONTROL SYSTEM FOR A HYBRID ELECTRIC VEHICLE AND A METHOD FOR CONTROLLING A HYBRID ELECTRIC VEHICLE

TECHNICAL FIELD

The present description relates to a control system for a hybrid electric vehicle and a method for controlling a hybrid electric vehicle. More particularly, this description relates to a control system and a control method suitable for a series hybrid electric vehicle.

BACKGROUND AND SUMMARY

The series hybrid electric vehicle designates a vehicle configured to drive an electric generator by an internal combustion engine (engine), to supply electric power from the electric generator to a motor, and to drive drive-wheels by the motor, as disclosed in US2007/0137908 A1, as an example. In a series hybrid electric vehicle, the engine is dedicated to generating electric energy, and the mechanical energy generated by the engine is not directly transmitted to the drive-wheel, in contrast to a parallel hybrid electric vehicle where some mechanical energy generated by an engine is directly transmitted to a drive-wheel.

One example of a hybrid electric vehicle is described by US2007/0137908 A1. This example discloses a hybrid electric vehicle configuration that uses a diode rectifier to reduce the loss of electric energy generated by a system by rectifying current generated by a generator driven by the engine and then driving a motor connected to the vehicle driving system. In this reference, an inverter is provided between the diode rectifier and the motor, and the motor is driven by alternating current from the inverter that converts a direct current rectified by the diode rectifier to alternating current.

However, the inventors have found that providing plural feed circuits for the motor and using either one or both of the feed circuits depending on an operating condition is preferable for boosting efficiency of the hybrid electric vehicle and/or prolonging life of components of the hybrid electric vehicle.

The technology described in the reference above does not utilize plural feed circuits. In this way, the approach used in the reference above may reduce efficiency of a hybrid electric vehicle and may further cause element(s) connected to the feed circuit to deteriorate.

Some embodiments of the present disclosure provide a control system or a control method for a hybrid electric vehicle to improve efficiency and to prolong the operational life of components of the hybrid electric vehicle. For example, an embodiment may provide plural feed circuits for a motor and use either or both of the feed circuits depending on an operating condition.

One embodiment of the present description includes a control system for a hybrid electric vehicle, the hybrid electric vehicle comprising: a generator driven by an engine to generate alternating current; a motor configured to provide a drive force to propel the vehicle and configured as a generator to regenerate energy during vehicle deceleration; a rectifier to rectify alternating current generated by the generator; an inverter connected to a feed circuit between the rectifier and the motor to convert direct current in the feed circuit into alternating current; a power supply connected to a line connecting the rectifier with the inverter; a first feed circuit to supply a current to the motor via the inverter; a second feed circuit to supply a current to the motor while bypassing the inverter, wherein the second feed circuit includes an alternating current converter. The control system may include a current calculating module to calculate a current, the current being at least one of a current to drive the motor and a current generated by the motor; and a feed controller to selectively implement a first mode when the calculated current is below a predetermined current value and to selectively implement a second mode when the calculated current is more than the predetermined current value. Either the first feed circuit or the second feed circuit may be used in the first mode and both the first feed circuit and the second feed circuit may be used in the second mode.

This control system can solve at least some of the issues of the related art described above.

In an example embodiment, both the generator and the motor are polyphase alternating current rotating machines, the rectifier is a diode rectifier, and the alternating current converter is a plurality of semiconductor switches that are provided for each phase for the polyphase generator and the polyphase motor.

In another example embodiment, the alternating current converter is a second inverter.

In another example embodiment, both the first inverter and the second inverter have a similar rated current, and the feed controller is configured to activate either the first or second inverter when the calculated current is below a predetermined current value.

In another embodiment, the feed controller may activate one of the first and second inverter, and may activate the other of the first and second inverter when it is decided that only one of the inverters is activated and a temperature of the activated inverter is above a predetermined temperature.

In another example embodiment, the generator can start the engine and can be driven by the engine when the vehicle is started, the system may further comprise a switching device to select a motor power feed mode if the power supply is connected to the motor via the second inverter and to select a starter power feed mode if the power supply is connected to the generator via the second inverter, and may also comprise a controller to switch to the starter power feed mode to start the engine.

As a non-limiting example, relay switch(es) or insulated gate bipolar transistors etc. can be used as an element of the "switching device".

In another embodiment, a method is provided for controlling a hybrid electric vehicle having a generator driven by an engine to generate alternating current, a motor configured to provide a drive force to propel the vehicle and configured as a generator to regenerate energy during vehicle deceleration, a rectifier to rectify alternating current generated by the generator, an inverter connected to a feed circuit between the rectifier and the motor to convert direct current in the feed circuit into alternating current, a power supply connected to a line connecting the rectifier with the inverter, a first feed circuit to supply a current to the motor via the inverter, a second feed circuit to supply a current to the motor while bypassing at least the inverter, and an alternating current converter provided in the second feed circuit. The method may include calculating a current, wherein the current is at least one of a current to drive the motor and a current generated by the motor; activating one of the first and second feed circuits when the calculated current is below a predetermined current value; and activating both the first and second circuits when the calculated current is more than the predetermined current value.

This method can solve at least some of the issues of the related reference described above.

In an example embodiment, both of the first inverter and the second inverter are set such that they have the same rated current, and controlling feed current is activating either the first or second inverter when the calculated current is below the predetermined current value.

In another example embodiment, controlling feed current is used to activate one of a first and second inverters, and controlling feed current is used to activate the other of the first and second inverters when it is decided that only one of the inverters is activated and a temperature of the activated inverter is above a predetermined temperature.

In another example embodiment, wherein the generator is further configured to start the engine, and the hybrid electric vehicle comprises a switching device for selectively switching between a motor power feed mode if the power supply is connected to the motor via the second inverter and a starter power feed mode if the power supply is connected to the generator via the second inverter, the method may further comprise switching the switching device such that the starter power feed mode is selected to start the engine.

DETAILED DESCRIPTION

Figure 1:
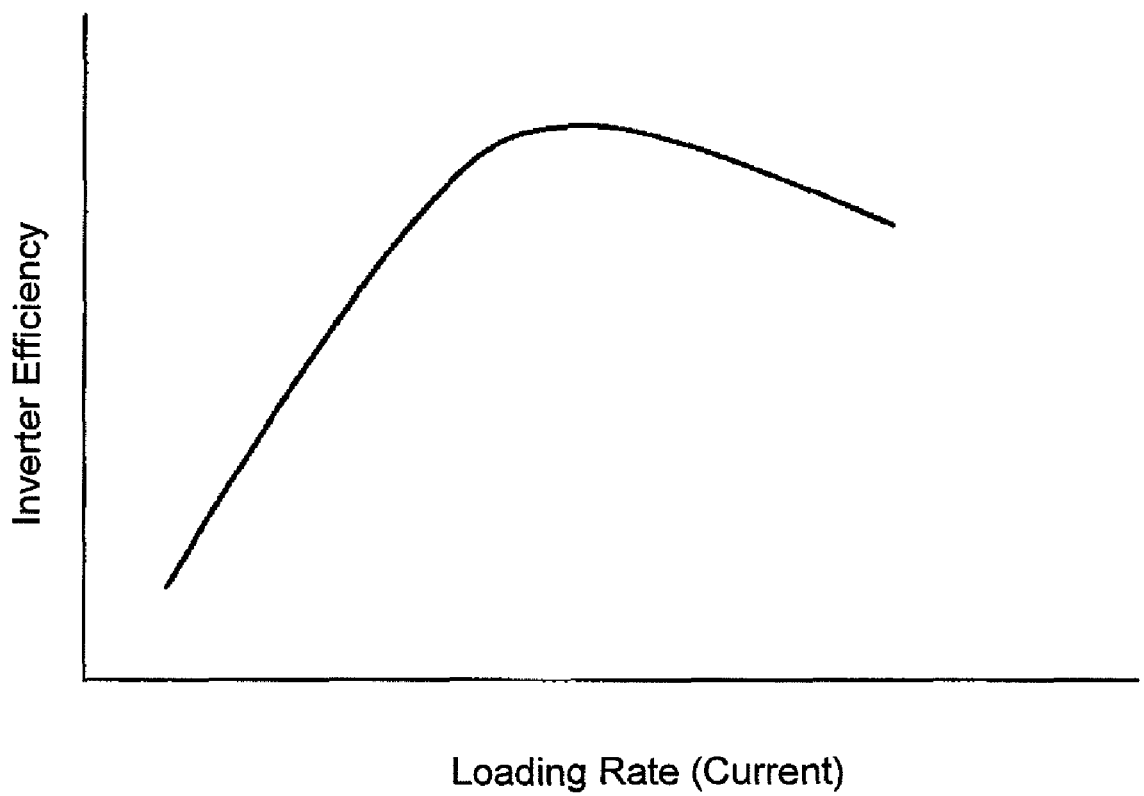
FIG. 1 is a characteristic graph of an inverter.

Hereafter, several embodiments of the present invention will be explained referring to the accompanying drawings. In the following embodiments, like reference numerals are given to like components to omit repeating explanations thereof.

Before explaining about specific embodiments, the specific purposes of these embodiments will be explained. FIG. 1 shows a characteristic graph of an inverter. Referring to FIG. 1, a common inverter has a diode. Typically, the diode has a characteristic in which its efficiency significantly decreases in an inverter operating condition where a loading rate (i.e., output current) is lower. On the other hand, in a vehicle operating condition, a capacity required for the inverter significantly changes. Therefore, in an operating condition in which an output is much less than a rated output, as the loading rate of the inverter decreases, the inverter efficiency is reduced accordingly and, thus, the inverter cannot be efficiently used. For this reason, in a first embodiment shown in FIGS. 2-8, it is configured so as to increase the inverter efficiency as much as possible by selectively using either one of the feed circuits.

First Embodiment

Figure 2:
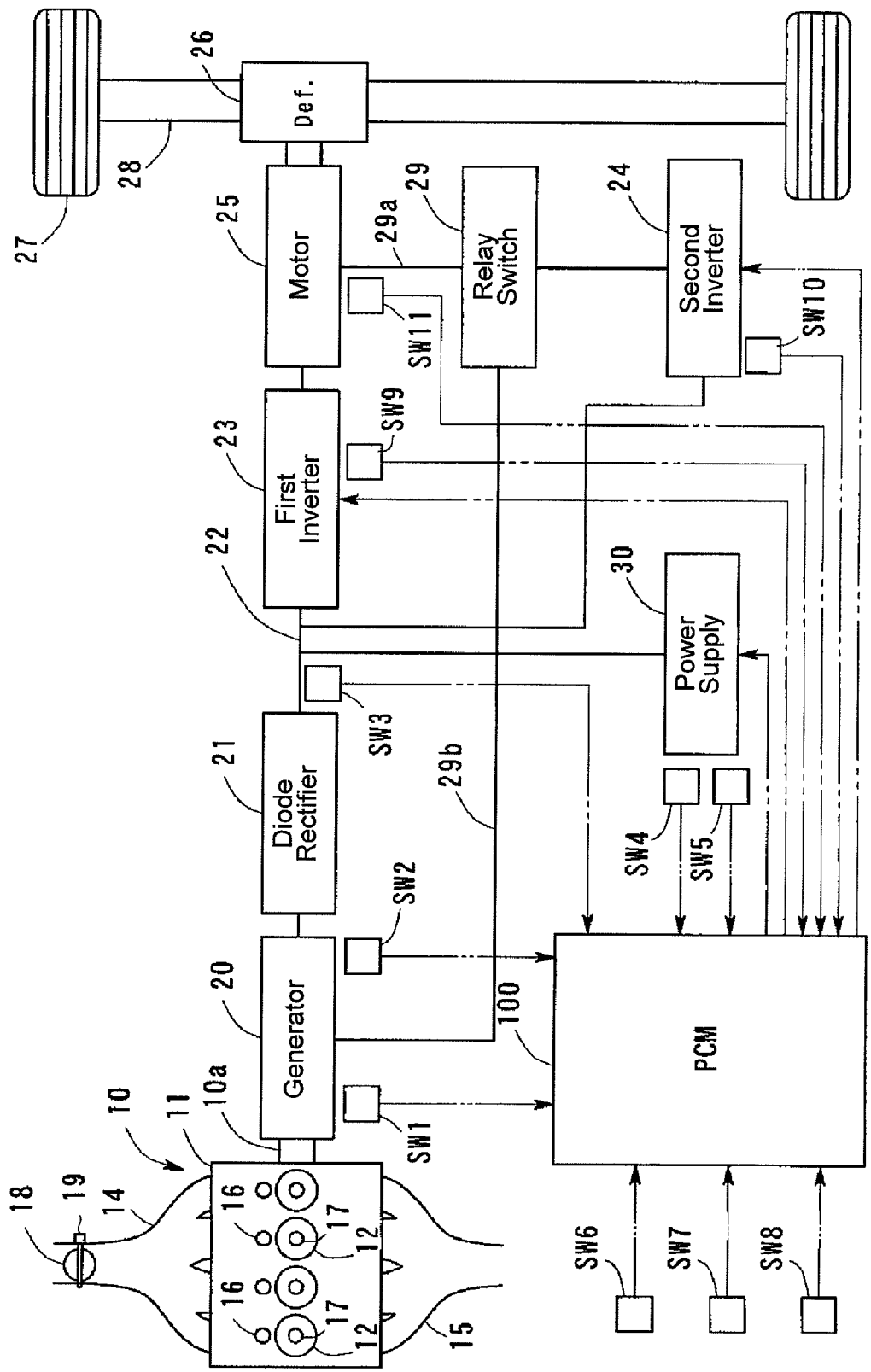
FIG. 2 is a schematic block diagram of a hybrid electric vehicle according to an embodiment of the invention.
Figure 3:
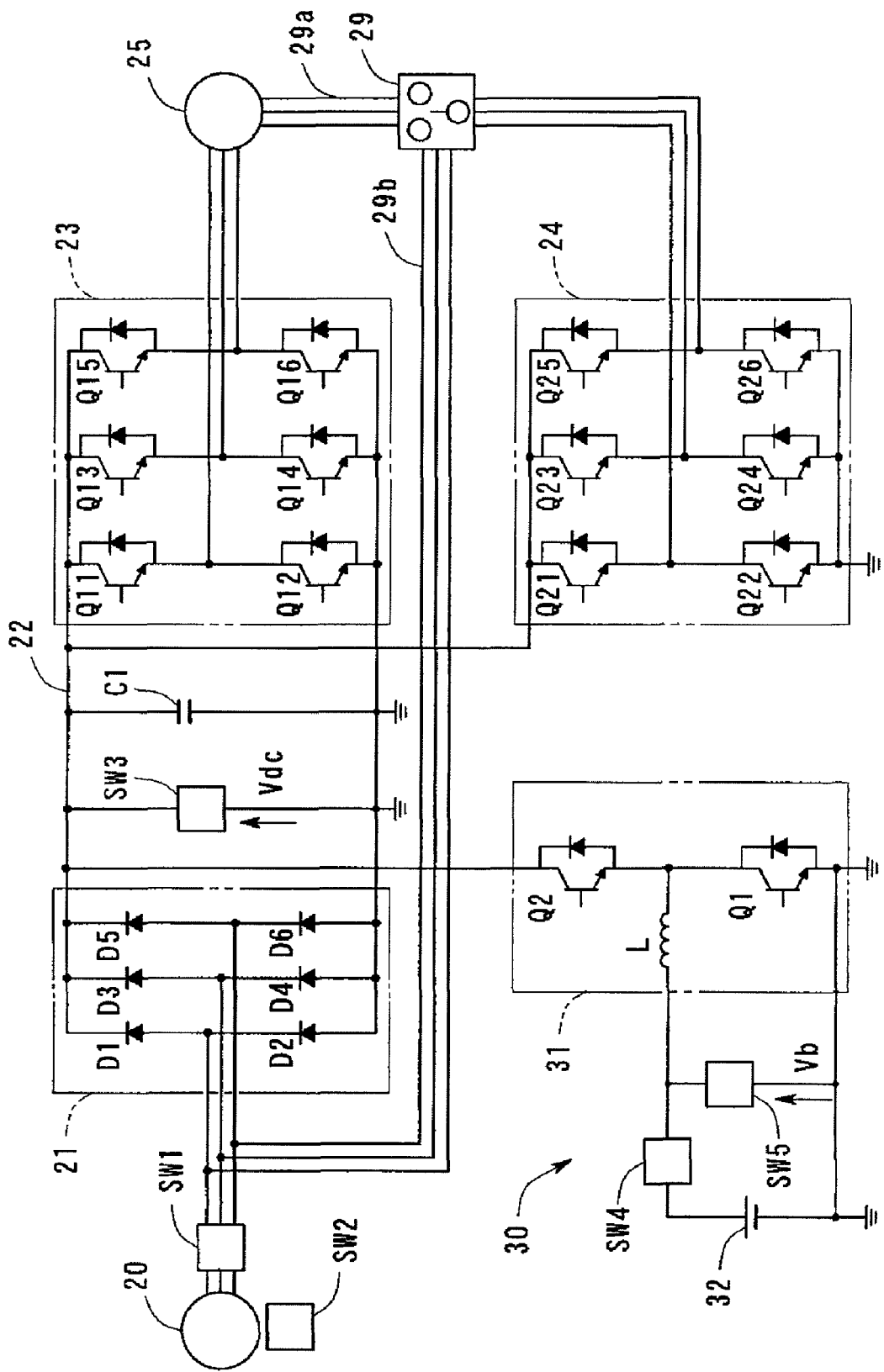
FIG. 3 is a circuit diagram showing a particular portion of the hybrid electric vehicle shown in FIG. 2.

FIG. 2 is a schematic block diagram of a hybrid electric vehicle according to an embodiment of the present invention, and FIG. 3 is a circuit diagram showing a particular portion of the hybrid electric vehicle.

Referring first to FIG. 2, the hybrid electric vehicle of this embodiment is a series hybrid electric vehicle, which includes an engine 10, and a generator 20 that is driven by the engine 10.

In this embodiment, the engine 10 is a multi-cylinder four-cycle gasoline engine, for example. The engine 10 includes an engine body 11 having a cylinder head and a cylinder block, two or more cylinders 12 formed in the engine body 11, an intake manifold 14 that introduces fresh air into each cylinder 12, and an exhaust manifold 15 that discharges the burnt gas from each cylinder 12. A fuel-injection valve 16 and a spark plug 17 are attached to the engine body 11, corresponding to each cylinder 12. As a piston provided in each cylinder 12 moves up and down, a crankshaft 10a connected to the pistons is driven to rotate. A throttle valve 18 for adjusting an amount of fresh air is provided in the intake manifold 14. The throttle valve 18 is driven by an actuator 19 of a throttle body.

Referring now to FIG. 3, in this embodiment, a generator 20 is a three-phase multiphase electric motor generator (three-phase electric motor in this embodiment) connected with the crankshaft 10a. The generator 20 supplies alternating current as it is driven by the engine 10, and it also functions as a motor that starts the engine 10 when supplied with alternating current. The generator 20 is provided with a generator output current sensor SW1 that detects its output current, and a generator rotation speed sensor SW2 that detects its rotation speed.

The generator 20 is connected to a diode rectifier 21. The diode rectifier 21 includes two or more sets of diodes D1-D6 corresponding to number of phases "n" of the generator 20. Output terminals of diode rectifier 21 are connected to a DC bus line 22 as a feed channel.

A capacitor C1 is also connected to the DC bus line 22. In addition, a DC bus line voltage sensor SW3 that detects a voltage of the DC bus line 22 is connected to the DC bus line 22.

In this embodiment, first and second inverters 23 and 24 are connected via the DC bus line 22 in parallel with each other. Each of the inverters 23 and 24 includes two or more sets of electrical elements Q11-Q16 and Q21-Q26, respectively, that serve as loads, corresponding to number of phases of a polyphase motor 25. Each of the elements Q11-Q16 and Q21-Q26 has a transistor, a diode, etc. In this embodiment, a rated current Ir of each of the inverters 23 and 24 is set slightly greater than half of the current required for the maximum output of a motor 25.

The first inverter 23 is connected to the motor 25. The motor 25 is connected with a differential mechanism 26 of the hybrid electric vehicle, and an axle 28 on the side of rear wheels 27 of the hybrid electric vehicle is driven through the differential mechanism 26. In this embodiment, the motor 25 also functions as a generator for battery regenerating.

The second inverter 24 is connected to a relay switch 29 as a switching module. The relay switch 29 serves as a contact between a feed channel 29a for a "normal operation" in which the second inverter 24 is connected to the generator 20, and a feed channel 29b for "engine starting" in which the second inverter 24 is connected to the motor 25. Thus, the relay switch 29 selectively connects the second inverter 24 to either one of the channels 29a and 29b so that the second inverter 24 supplies alternating current to the motor 25 through the first inverter 23, or supplies power to the generator 20 to drive the engine 10 for starting, according to an operating condition of the vehicle.

In addition, a power supply 30 is also connected to the DC bus line 22. The power supply 30 includes a DC-DC converter 31 and a battery 32 connected to the DC-DC converter 31.

The DC-DC converter 31 includes a booster element Q1, a step-down element Q2, and an reactor L. Each of the elements Q1 and Q2 contains a transistor. As the transistor of the booster element Q1 is turned ON/OFF at a predetermined timing to maintain the transistor of the step-down element Q2 at OFF, the reactor L is charged to make the battery 32 higher in absolute voltage than DC bus line 22 to flow electric power to the DC bus line 22 from the battery 32. On the other hand, as the transistor of the step-down element Q2 is turned ON/OFF at a predetermined timing to maintain the transistor of the booster element Q1 at OFF, the DC bus line 22 is made higher in absolute voltage than battery 32 to flow electric power from the DC bus line 22 into the battery 32.

The hybrid electric vehicle is also provided with a vehicle speed sensor SW6, a gas-pedal opening sensor SW7, and a brake sensor SW8, in order to detect the operating condition of the vehicle.

Further, in this embodiment, the hybrid electric vehicle is also provided with first and second inverter temperature sensors SW9 and SW10 that detect temperatures of the inverters 23 and 24, respectively, and a motor rotation speed sensor SW11 that detects a rotation speed of the motor 25.

Figure 4:
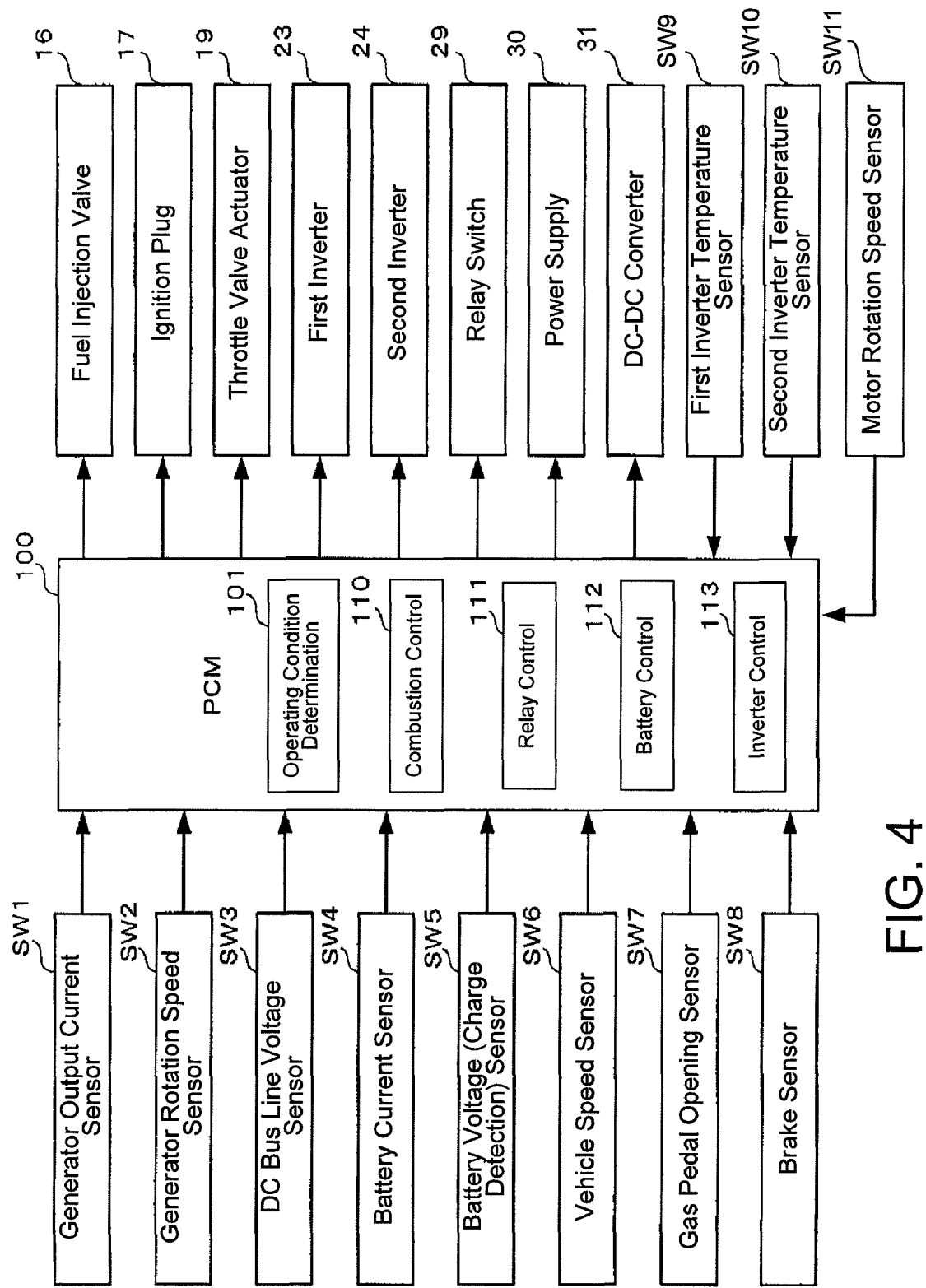
FIG. 4 is a block diagram showing a schematic configuration of the hybrid electric vehicle shown in FIGS. 2 and 3.

FIG. 4 is a block diagram showing a schematic configuration of the hybrid electric vehicle shown in FIGS. 2 and 3.

Referring to FIG. 4, the hybrid electric vehicle shown in FIG. 2 is controlled, for example by a control unit 100 as a control module, such as a power train control module (PCM).

The control unit 100 typically is a microprocessor provided with a CPU, a memory, etc. The control unit 100 causes a program module to read detection signals from input elements, perform predetermined calculating processes, and output control signals to output elements, as more specifically described later. In this embodiment, although the control unit 100 is illustrated as a single unit, it may be a module assembly to which two or more units are combined.

Input elements of the control unit 100 include a generator output current sensor SW1, a generator rotation speed sensor SW2, a DC bus line voltage sensor SW3, a battery current sensor SW4, a battery voltage sensor SW5, a vehicle speed sensor SW6, a gas-pedal opening sensor SW7, a brake sensor SW8, first and second inverter temperature sensors SW9 and SW10, and a motor rotation speed sensor SW11. Although not specifically illustrated in this embodiment, various other sensors equipped on the engine 10, such as a coolant temperature sensor, a rotational angle sensor, a throttle opening sensor, etc., may also be connected to the control unit 100 for a combustion control of the engine 10.

On the other hand, as output elements of the control unit 100, they include fuel-injection valves 16, spark plugs 17, a throttle valve actuator 19, first and second inverters 23 and 24, a relay switch 29, and a DC-DC converter 31.

In addition, the control unit 100 logically includes an operating condition determining module 101, a combustion control module 110 that performs an operation control of the engine 10, a relay control module 111 that performs a power-supply control by the relay switch 29, a battery control module 112 that controls the DC-DC converter 31, and an inverter control module 113.

The operating condition determining module 101 determines an operating condition of the hybrid electric vehicle based on detections of the sensors SW1-SW7. In this embodiment, the operating condition determining module 101 is also provided with a function to determine an existence of an engine operation request of the hybrid electric vehicle, as well as a function to determine temperature conditions of the inverters 23 and 24.

The combustion control module 110 controls the fuel-injection valves 16, the spark plugs 17, and the throttle valve actuator 19, etc., to control a rotation speed of the engine 10 (i.e., engine speed), and thereby controlling the rotation speed of the generator 20.

The relay control module 111 switches the relay switch 29 based on the determination result of the operating condition determining module 101 to selectively switch between a "motor feed mode" in which the second inverter 24 is connected to the motor 25 through the feed channel 29a for "normal operation," and a "starter feed mode" in which the second inverter 24 is connected to the generator 20 through the feed channel 29b for "engine starting" to drive the generator 20 as a motor and thereby starting the engine 10.

The battery control module 112 usually functions to maintain a supplying current from the battery 32 at a constant rate during the use of the power supply 30, or to prevent an over-current at the time of the battery regenerating, based on the outputs of the battery current sensor SW4 and the battery voltage sensor SW5.

The inverter control module 113 controls ON/OFF operations of the first and second inverters 23 and 24 based on the determination result of the operating condition determining module 101 to control a loading condition of an object to which power is supplied from each of the inverters 23 and 24 at the optimum. In this embodiment, the inverter control module 113 also functions as a current calculating module for calculating a supplying current required for a target load (for example, the motor 25), or calculating a current to be generated by the motor 25 at the time of regenerating operation.

The control unit 100 controls the engine 10, the generator 20, the first and second inverters 23 and 24, the motor 25, the relay switch 29, and the DC-DC converter 31, etc., based on the determination result of the operating condition determining module 101. By this control, within an operating range of a vehicle startup or a low torque, the relay switch 29 is switched to connect the second inverter 24 to the motor 25, and supplies power of the battery 32 to the motor 25 from the first and second inverters 23 and 24, thereby propelling the vehicle based on the power supply of the battery 32. On the other hand, within an operating range where a requested load is a high or middle torque, the relay control module 111 switches the relay switch 29 to the starter feed mode according to a flowchart as described later, to start the engine 10 using the generator 20 as a generator. Then, after the engine 10 is started, the current supplied from the generator 20 mainly drives the motor 25 through the first inverter 23.

Next, referring to FIG. 5, an example control of this embodiment will be explained.

Figure 5:
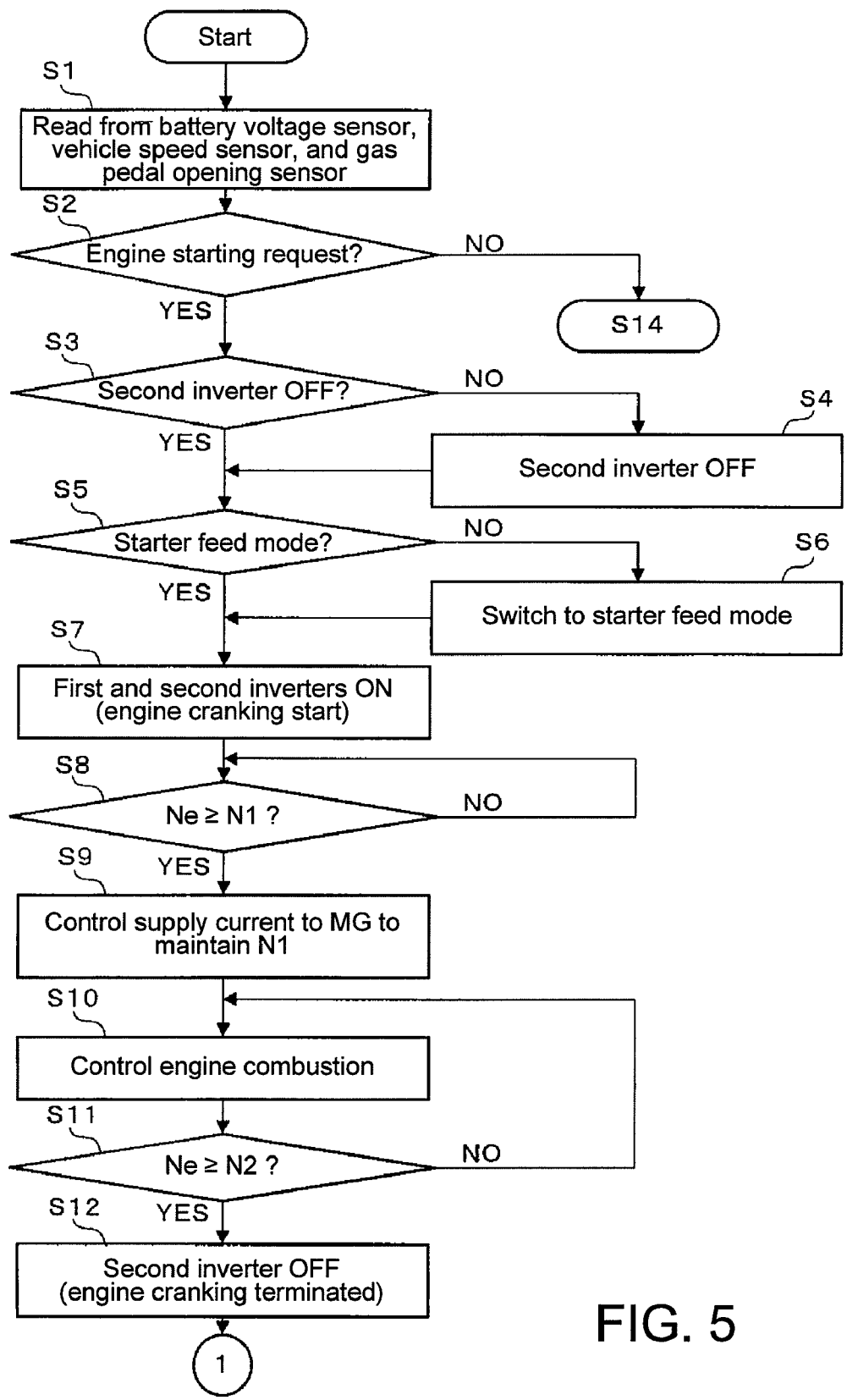
FIG. 5 is a flowchart showing an example control in this embodiment, the flowchart continuing to FIGS. 6 and 7.
Figure 6:
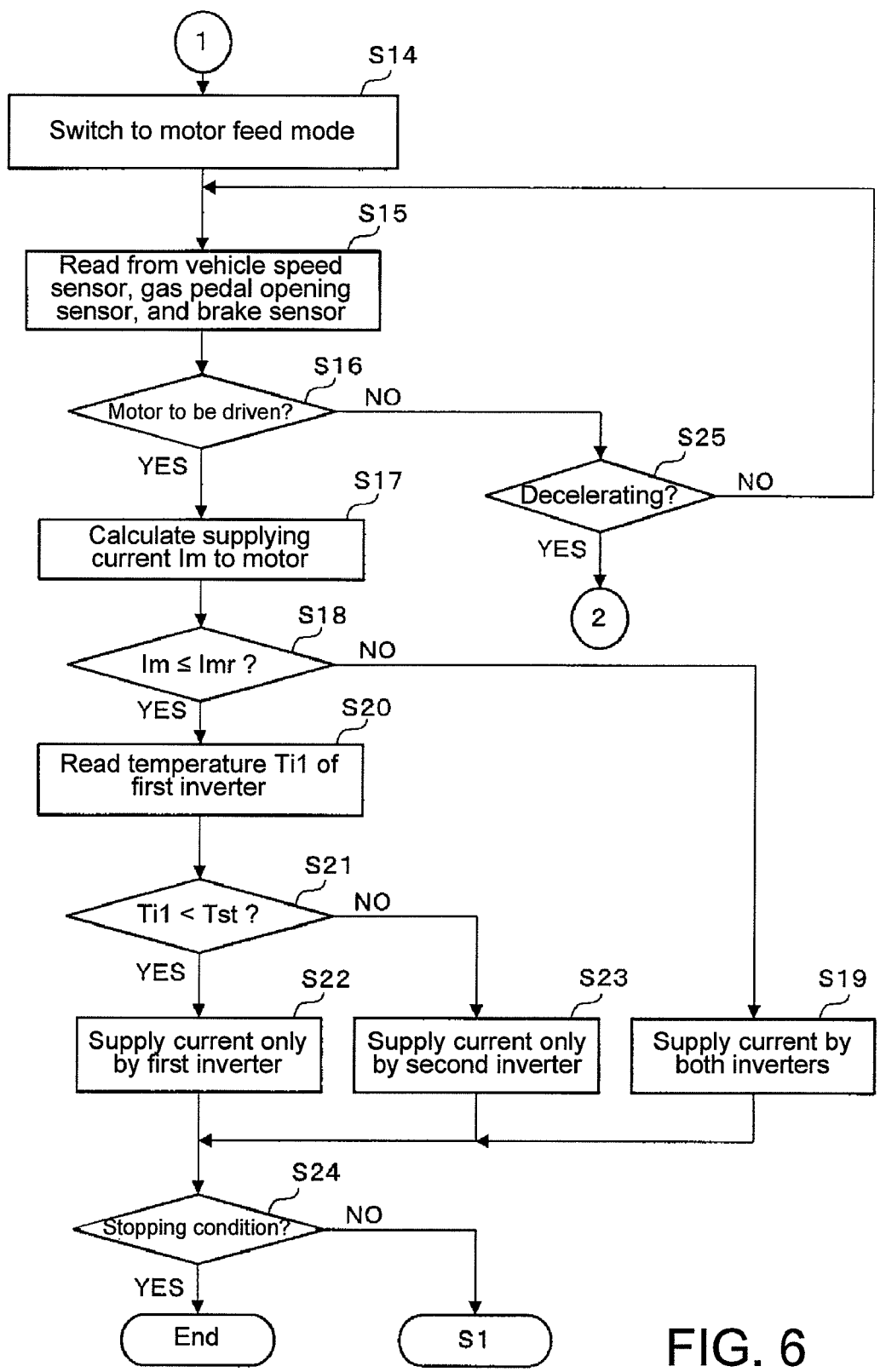
FIG. 6 is a flowchart showing the example control in this embodiment, the flowchart continuing from FIG. 5 and to FIG. 7.
Figure 7:
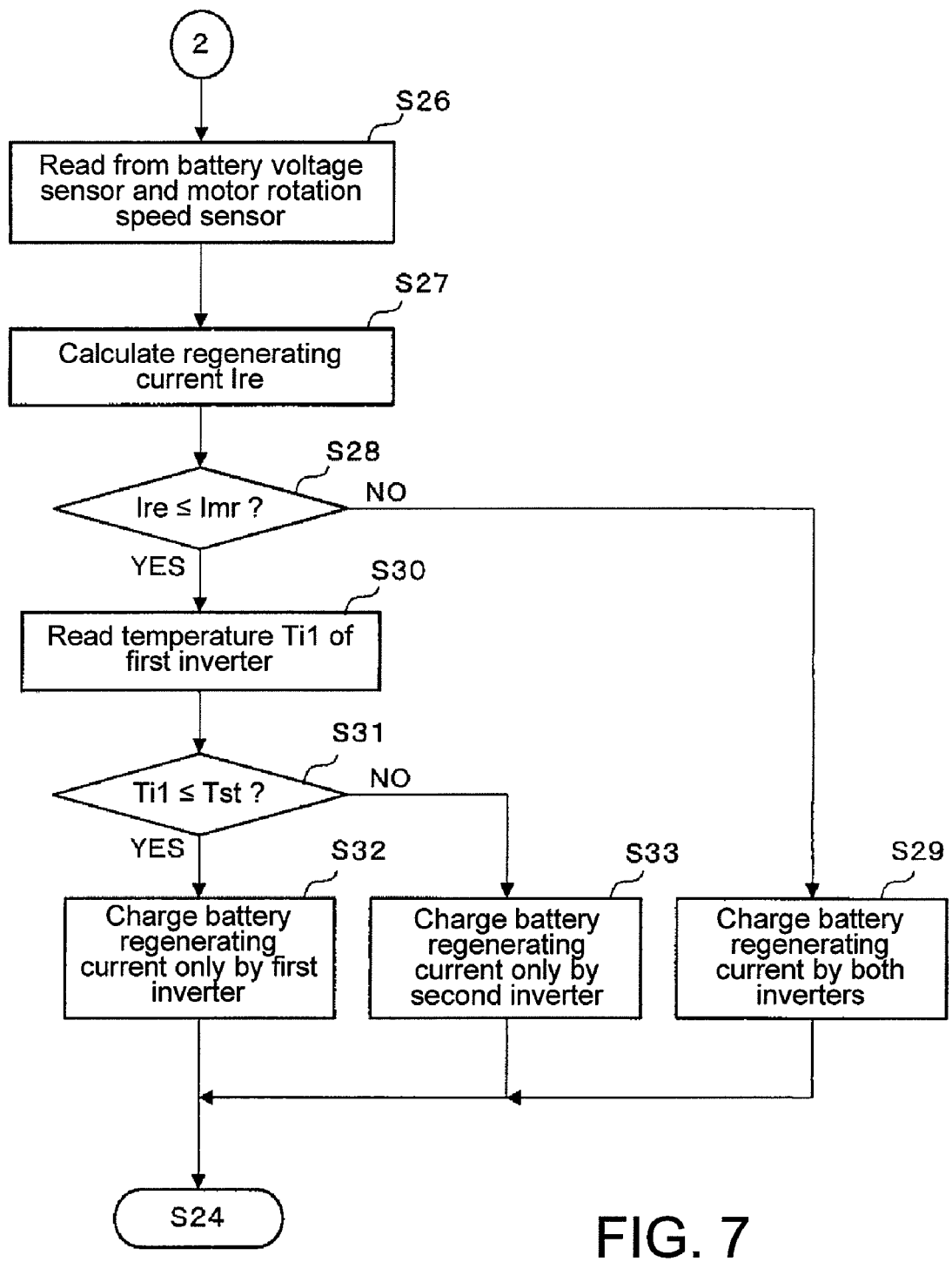
FIG. 7 is a flowchart showing the example control in this embodiment, the flowchart continuing from FIGS. 5 and 6.

FIGS. 5-7 are flowcharts showing the example control of this embodiment.

First, referring to FIG. 5, the operating condition determining module 101 determines a starting request of the engine 10 by a known method based on detection signals from the battery voltage sensor SW5, the vehicle speed sensor SW6, the gas-pedal opening sensor SW7, the brake sensor SW8, etc. (Steps S1 and S2). More specifically, the operating condition determining module 101 determines that there is a starting request of the engine 10 when the brake pedal is not pressed down but the gas pedal is pressed down, and the vehicle is operated within the high or middle torque range. If the starting request of the engine 10 is not detected, the determining module 101 proceeds to Step S14 (see FIG. 6), as described later.

If it is determined that there is a starting request of the engine 10, the operating condition determining module 101 then determines whether the second inverter 24 is OFF (Step S3). If the second inverter 24 is ON, the second inverter 24 is turned OFF (Step S4). On the other hand, if the second inverter 24 is OFF, or if the second inverter 24 is switched to OFF, the operating condition determining module 101 then determines whether the relay switch 29 is in the starter feed mode (i.e., a mode in which the second inverter 24 is connected to the generator 20) (Step S5). If the relay switch 29 is not in the starter feed mode, that is, if it is in the motor feed mode (i.e., a mode in which the second inverter 24 is connected to the motor 25), the relay control module 111 switches the relay switch 29 to the starter feed mode to connect the second inverter 24 to the generator 20 (Step S6). On the other hand, if the relay switch 29 is in the starter feed mode, or if it is switched to the starter feed mode, the battery control module 112 performs a boosting operation of the DC-DC converter 31, while the inverter control module 113 turns ON the first and second inverters 24 (Step S7). Thus, current flows from the power supply 30 through the DC bus line 22 into the first and second inverters 23 and 24. Then, a driving current that drives the motor 25 flows through the first inverter 23, while a driving current that drives the generator 20 flows through the second inverter 24. As a result, the generator 20 functions as a motor to drive the crankshaft 10a to start the engine 10, and in parallel to the engine starting, the motor 25 propels the vehicle. Thus, in this embodiment, by adopting two or more inverters 23 and 24, the starting operation of the engine 10 by the generator 20 and the propelling operation of the vehicle by the motor 25 can be simultaneously performed in parallel.

When the engine 10 is driven, it stands by that the rotation speed Ne of the generator 20 (that is, engine speed) reaches greater than a predetermined starting speed N1 (Step S8).

If the rotation speed Ne of the generator 20 reaches the starting speed N1, the control unit 100 controls an amount of the supplying current so that the rotation speed Ne of the generator 20 is maintained at the starting speed N1 (Step S9). More specifically, the amount of supplying current is controlled by the switching operation of the DC-DC converter 31 with the battery control module 112, and the control of the second inverter 24 with the inverter control module 113.

Next, the combustion control module 110 controls an air-intake pressure, a fuel-injection amount, a fuel-injection timing, and an ignition timing of the engine 10 based on a well-known engine control method to perform a combustion control of the engine 10 (Step S10). Next, the control unit 100 stands by until the rotation speed Ne of the generator 20 reaches greater than a predetermined starting termination speed N2 (Step S11).

Then, if the rotation speed Ne of the generator 20 reaches greater than the starting termination speed N2, the inverter control module 113 initially turns OFF the second inverter 24 (Step S12), and then terminates the cranking operation.

Next, as shown in FIG. 6, when the current stops, the relay control module 111 then switches the relay switch 29 to the motor feed mode (Step S14), and it proceeds to the so-called "normal operation control," as shown in the processes after Step S15. In this embodiment, during the normal operation control, by turning ON/OFF the second inverter 24 according to the operating condition even after the relay switch 29 is switched to the motor feed mode, efficiency of the first inverter 23 can be improved and, thus, it is also possible to improve the efficiency of the feed circuit.

In the control after Step S15, the operating condition determining module 101 again reads the detection signals of the vehicle speed sensor SW6, the gas-pedal opening sensor SW7, and the brake sensor SW8 (Step S15). Then, the determining module 101 determines based on the detection signals of these sensors SW6-SW8 whether it is in an operating range where the motor 25 is required to be driven (Step S16).

If it is in the operating condition where the motor 25 is required to be driven, the inverter control module 113 as a current calculating module calculates a supplying current Im required for the motor 25 (Step S17). Then, the operating condition determining module 101 determines whether the calculated supplying current Im is below a predetermined current Imr (Step S18). In this embodiment, the predetermined current Imr is set equally to the rated current Ir of the inverters 23 and 24. Therefore, if the calculated supplying current Im is greater than the predetermined current Imr, the motor 25 is driven by both the inverters 23 and 24 (Step S19). On the other hand, if the supplying current Im is below the predetermined current, the operating condition determining module 101 reads the value of the temperature sensor SW9 for the first inverter 23, and then compares the detected temperature Ti1 with a predetermined temperature Tst to determine whether a sole operation of the first inverter 23 is possible (Steps S20 and S21). In this embodiment, the predetermined temperature Tst is obtained by experiments which is mapped with the inverter efficiency, and is a temperature at which the inverter efficiency decreases during its operation. If the detected temperature Ti1 is below the predetermined temperature Tst, the current is supplied to the motor 25 only through the first inverter 23. On the other hand, if the detected temperature Ti1 is greater than the predetermined temperature Tst, the current is supplied to the motor 25 only through the second inverter 24. When any one of Steps S19, S22, and S23 is performed, the battery control module 112 performs the boosting operation of the DC-DC converter 31 to control so that the current flows into the first and second inverters 23 and 24 from the DC bus line 22.

After any one of Steps S19, S22, and S23 is performed, it is then determined whether a vehicle stopping condition (i.e., a condition to be determined based on a change in the vehicle speed, or a pressing-down of the brake pedal, for a determination of stopping the vehicle) is satisfied (Step S24). If the vehicle stopping condition is satisfied, the process is then terminated. On the other hand, if it is not satisfied, the process returns to Step S1 (see FIG. 5) to repeat the process above.

Further, at Step S16, if it is determined that the motor is not required to be driven, the operating condition determining module 101 determines whether the vehicle is slowing down or decelerating based on the detection signals of the vehicle speed sensor SW6 or the brake sensor SW8 (Step S25). If the vehicle is slowing down, it proceeds to the process for regenerating, as shown in FIG. 7. On the other hand, if the vehicle in not slowing down, it returns to Step S15 to repeat the process described above.

Next, referring to FIG. 7, if it is determined that the vehicle is slowing down by the determination at Step S25, the operating condition determining module 101 reads the detection signals of the battery voltage sensor SW5 and the motor rotation speed sensor SW11 (Step S26). The inverter control module 113 as a current calculating module calculates a regenerating current Ire to be generated by the motor 25 based on the detection signals of these sensors SW5 and SW11 (Step S27). Then, the operating condition determining module 101 determines whether the calculated regenerating current Ire is below the predetermined current Imr that is equal to the rated current Ir (Step S28). If the calculated regenerating current Ire is greater than the predetermined current Imr, both the inverters 23 and 24 charge the battery 32 with the regenerating current Ire of the motor 25 (Step S29). On the other hand, if the regenerating current Ire is below the predetermined current, the operating condition determining module 101 further reads the value of the temperature sensor SW9 for the first inverter 23, and then compares the detected temperature Ti1 with the predetermined temperature Tst to determine whether a sole operation of the first inverter 23 is possible (Steps S30 and S31). If the detected temperature Ti1 is below the predetermined temperature Tst, only the first inverter 23 charges the battery 32 with the regenerating current of the motor 25 (Step S32). On the other hand, if the detected temperature Ti1 is greater than the predetermined temperature Tst, only the second inverter 24 charges the battery 32 with the regenerating current of the motor 25 (Step S33). In this embodiment, when any one of Steps S29, S32, and S33 is performed, the battery control module 112 then performs a step-down operation of the DC-DC converter 31 to control so that the current flows from the DC bus line 22 into the battery 32.

After any one of Steps S29, S32, and S33 is performed, the control proceeds to Step S24 (see FIG. 6) to repeat the processes described above.

As explained above, a control device configured to implement a control method of the hybrid electric vehicle of this embodiment includes a generator 20 that is driven by an engine 10 to generate alternating current, a motor 25 that propels the vehicle, a diode rectifier 21 that rectifies the alternating current generated by the generator 20, a first inverter 23 connected to a feed channel between the diode rectifier 21 and the motor 25 and converts direct current in the feed channel into alternating current, a second inverter 24 connected to the feed channel in parallel with the first inverter 23, and a battery 32 connected to the feed channel. The control device configured to implementing the control method also includes a current calculating module that calculates a current Im required to drive the motor 25 or a current Ire to be generated by the motor 25 (Calculating Steps S17 and S27), and an inverter control module that operates either one of the first and second inverters 23 and 24 when the calculated currents Im and Ire are below a predetermined current Imr, while it operates both inverters when the calculated currents are greater than the predetermined current Imr (Control Steps S21-23 and S31-33).

Therefore, in this embodiment, when supplying power to the motor 25, the current Im required for the motor drive is calculated, and the first and second inverters 23 and 24 are then controlled to be selectively activated based on the calculated current Im, and thereby improving the efficiency of the active inverter 23 (or 24). For example, as shown in FIG. 6 of this embodiment, the predetermined current Imr is preset, and when the current Im required for the motor drive is below the predetermined current Imr, only one inverter 23 (or 24) is activated to improve the load of the active inverter. Therefore, it is possible to perform a control to prevent a reduction in the efficiency.

Similarly, when the motor 25 generates for regenerating, the current Ire to be generated by the motor 25 is calculated, and the first and second inverters 23 and 24 are controlled to be activated based on the calculated current Ire, and thereby improving the efficiency of the active inverter 23 (or 24). For example, as shown in FIG. 7 of this embodiment, the predetermined current Imr is preset, and when the current Ire generated by the motor 25 is below the predetermined current Imr, only one inverter 23 (or 24) is activated to increase the load of the active inverter. Therefore, it is possible to perform a control to prevent reduction in the efficiency.

Further, in this embodiment, the first and second inverters 23 and 24 are set to the same rated current Ir, and the inverter control module 113 activates only one of the inverters when the current calculated by the current calculating module is below the rated current. Therefore, in this embodiment, the load of an inverter can be maintained greater than a certain value on the basis of the rated currents of the first and second inverters 23 and 24, to control the reduction in the inverter efficiency.

In this embodiment, when the temperature Ti1 of the inverter that is activated with higher priority is over the predetermined temperature Tst, another inverter (in this embodiment, the second inverter 24) is activated. Therefore, in this embodiment, the inverters can be activated with a priority of the lower temperature inverters. Thus, heat damage or thermal deterioration of the inverters can be certainly prevented, and efficiency and durability of each inverter can be maintained.

This embodiment adopts a method of selecting the inverter 23 or 24 based only on the detected temperature Ti1 of the temperature sensor SW9 for the first inverter 23 that is activated with higher priority, in which the first inverter 23 is activated with higher priority when the detected temperature Ti1 is low, or otherwise, the second inverter 24 is activated when the detected temperature Ti1 is high. However, without limiting to this embodiment, the detection values of the temperature sensors SW9 and SW10 of the first and second inverters 23 and 24 are compared, and based on the comparison, an inverter only on the low-temperature side may be selected.

Both the first and second inverters inverter 23 and 24 may be activated when the temperature Ti1 of the active inverter with higher priority is over another predetermined temperature Tst2 (<Tst).

In this embodiment, the generator 20 functions as a starter to drive the engine 10 at starting. The generator 20 includes a relay switch 29 as a switching module that can selectively switch between the motor feed mode in which the second inverter is connected to the motor 25, and the starter feed mode in which the battery is connected to the generator 20 through the second inverter 24. The generator 20 further includes a relay control module 111 as a control module that switches the relay switch 29 to the starter feed mode at the time of starting the engine 10. Thus, in this embodiment, when the motor 25 needs to be driven at the time of starting the engine 10, it is possible to drive the motor 25 through the first inverter, while the generator 20 is driven through the second inverter.

In this embodiment, the relay switch 29 is adopted as a switching module. For this reason, in this embodiment, it is possible to construct a circuit with lesser losses compared with the case where an insulated gate bipolar transistor etc. is adopted.

Further, in this embodiment, upon switching the relay switch 29, when the second inverter 24 is ON, once the second inverter 24 is turned OFF, and the relay switch 29 is then switched, and the second inverter 24 is then turned back ON. For this reason, in this embodiment, because the switching operation is performed in a state where power is not supplied to the relay switch 29, deterioration of the relay switch 29 can be reduced, and prolonging life of the relay switch 29 can be achieved.

Second Embodiment

Figure 8:
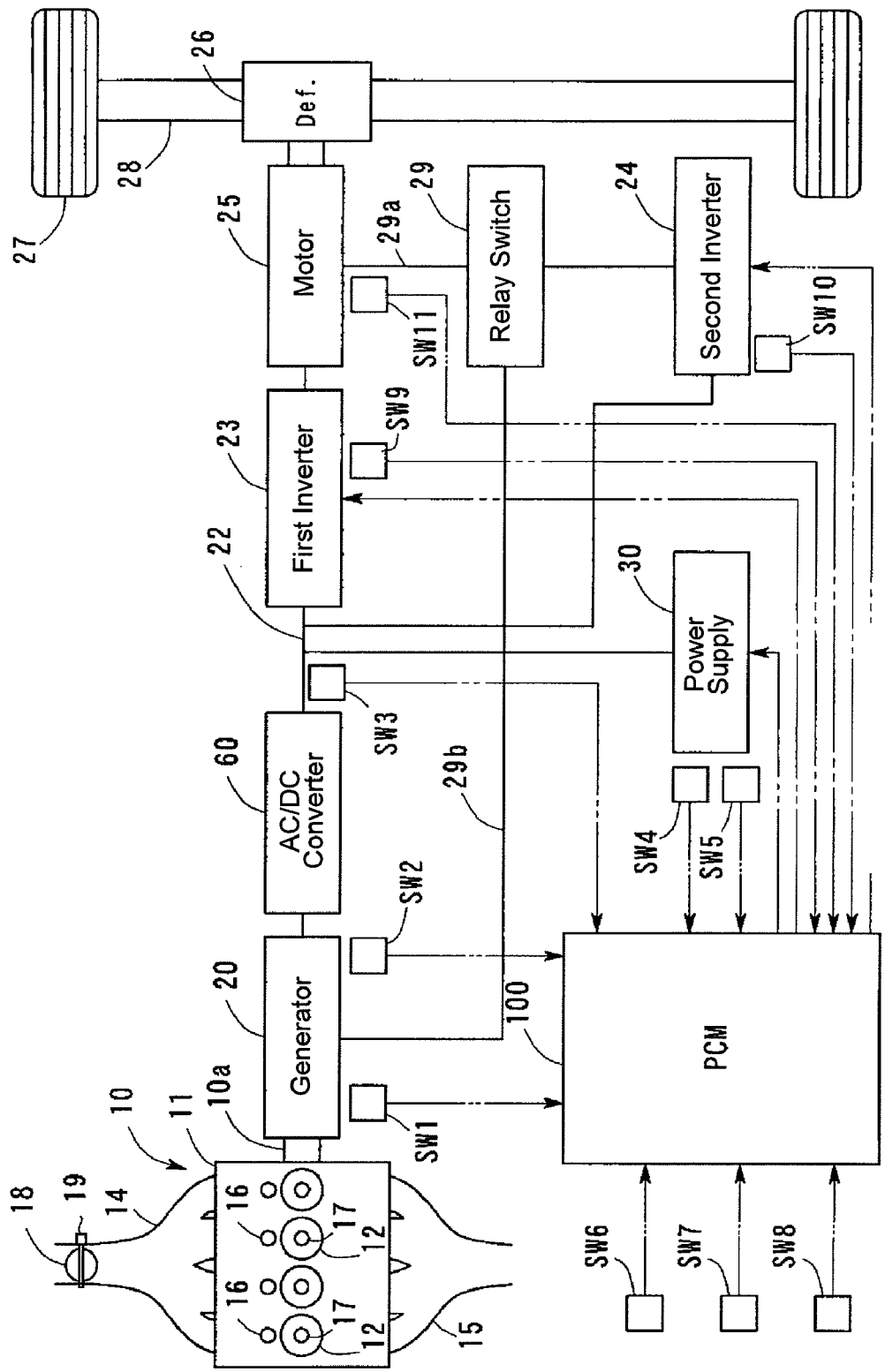
FIG. 8 is a schematic block diagram of a hybrid electric vehicle according to another embodiment of the invention.

FIG. 8 is a schematic block diagram of a hybrid electric vehicle according to another embodiment of the invention.

As shown in FIG. 8, an AC/DC converter 60 having an inverter may be adopted as a rectifier that rectifies alternating current generated by the generator 20, without limiting to the diode rectifier 21 shown in the embodiment of FIG. 2.

The circuit configuration that adopts the diode rectifier 21 can reduce loss of the feed circuit as much as possible, but it may be difficult to control the current generated by the generator 20. On the other hand, if the AC/DC converter 60 is adopted, it is possible to control the current of the generator 20.

Third Embodiment

Next, still another embodiment of the invention will be explained.

The following embodiment shown in FIGS. 9-14 is mainly concerned with providing two or more feed channels in a hybrid electric vehicle, and upon selectively using the two or more feed circuits according to an operating condition, preventing deterioration of the inverters and prolonging life of the inverters can be achieved. In other words, as increasing the loading rates of the inverters, it is possible to improve the inverter efficiencies. However, if overloaded condition of the inverters continues, it may cause heat generation on the inverters or deterioration of the inverters associated therewith. Thus, the following embodiment shown in FIGS. 9-14 is generally configured to selectively use two or more feed circuits to prolong life of the inverters.

Figure 9:
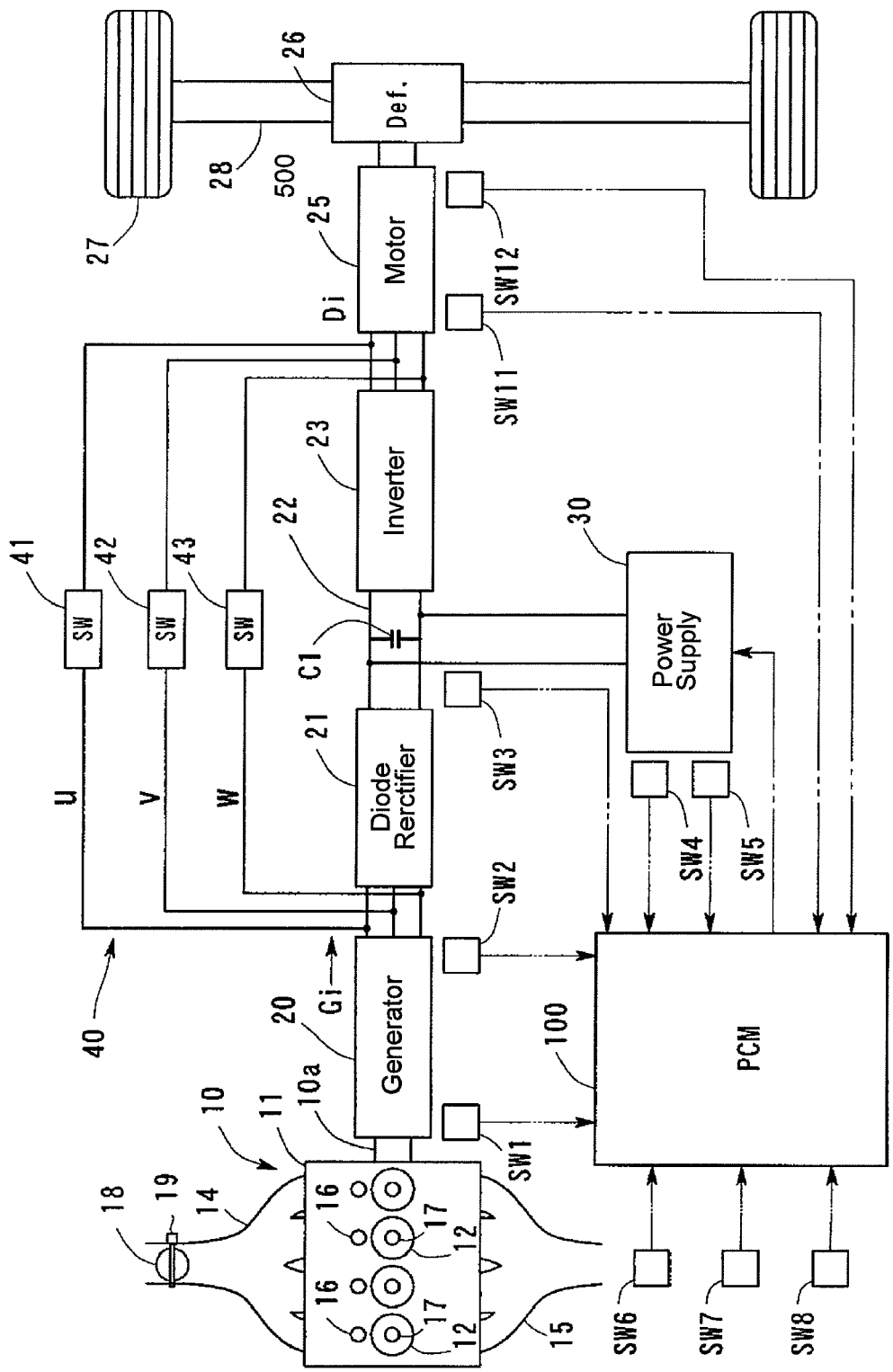
FIG. 9 is a schematic block diagram of a hybrid electric vehicle according to still another embodiment of the invention.

FIG. 9 is a schematic block diagram of the hybrid electric vehicle according to this embodiment.

Referring to FIG. 9, in the hybrid electric vehicle according to this embodiment, a generator 20, a DC bus line 22, and an inverter 23 constitute a first feed channel of three phases, and the vehicle also includes a bypass circuit 40 provided between a generator 20 and a motor 25, which constitutes a second feed channel in parallel with the first feed channel.

The bypass circuit 40 includes the AC bypass switches 41-43 provided for each phase of the generator 20 (e.g., u-phase, v-phase, and w-phase).

Figure 10:
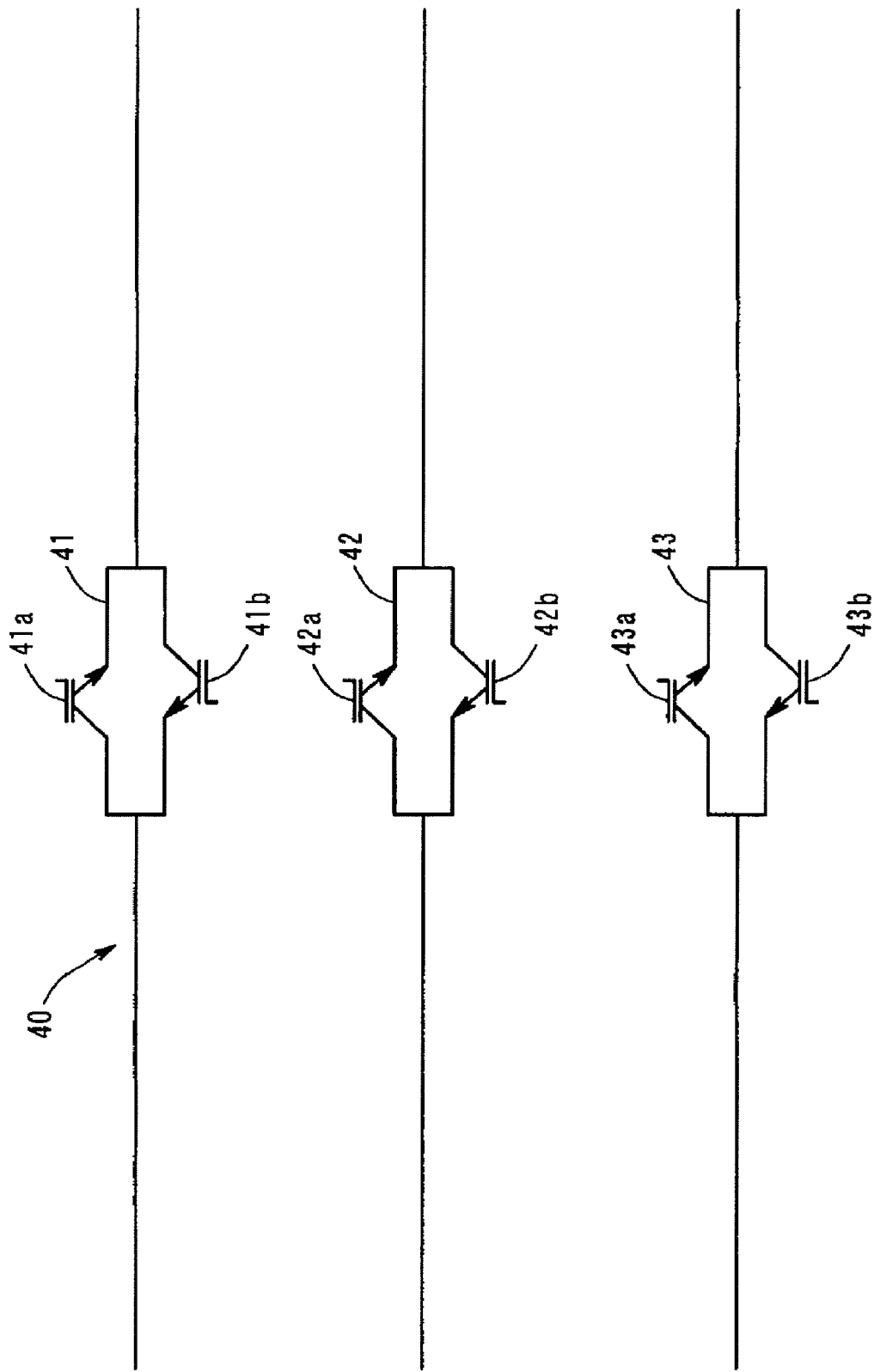
FIG. 10 is a circuit diagram showing semiconductor switches of a bypass circuit of FIG. 9.

FIG. 10 is a circuit diagram showing the AC bypass switches 41-43 of the bypass circuit 40 of FIG. 9.

Also referring to FIG. 10, each of the AC bypass switches 41-43 is implemented with a semiconductor switch having pairs of forward transistors (41a-43a) that control current flowing from the generator 20 to the motor 25, and transistors (41b-43b) for opposite direction that controls current flowing from the motor 25 to the generator 20. Each of the transistors 41a-43a and 41b-43b are configured so that ON/OFF operation thereof is controlled by a control unit 100.

Figure 11:
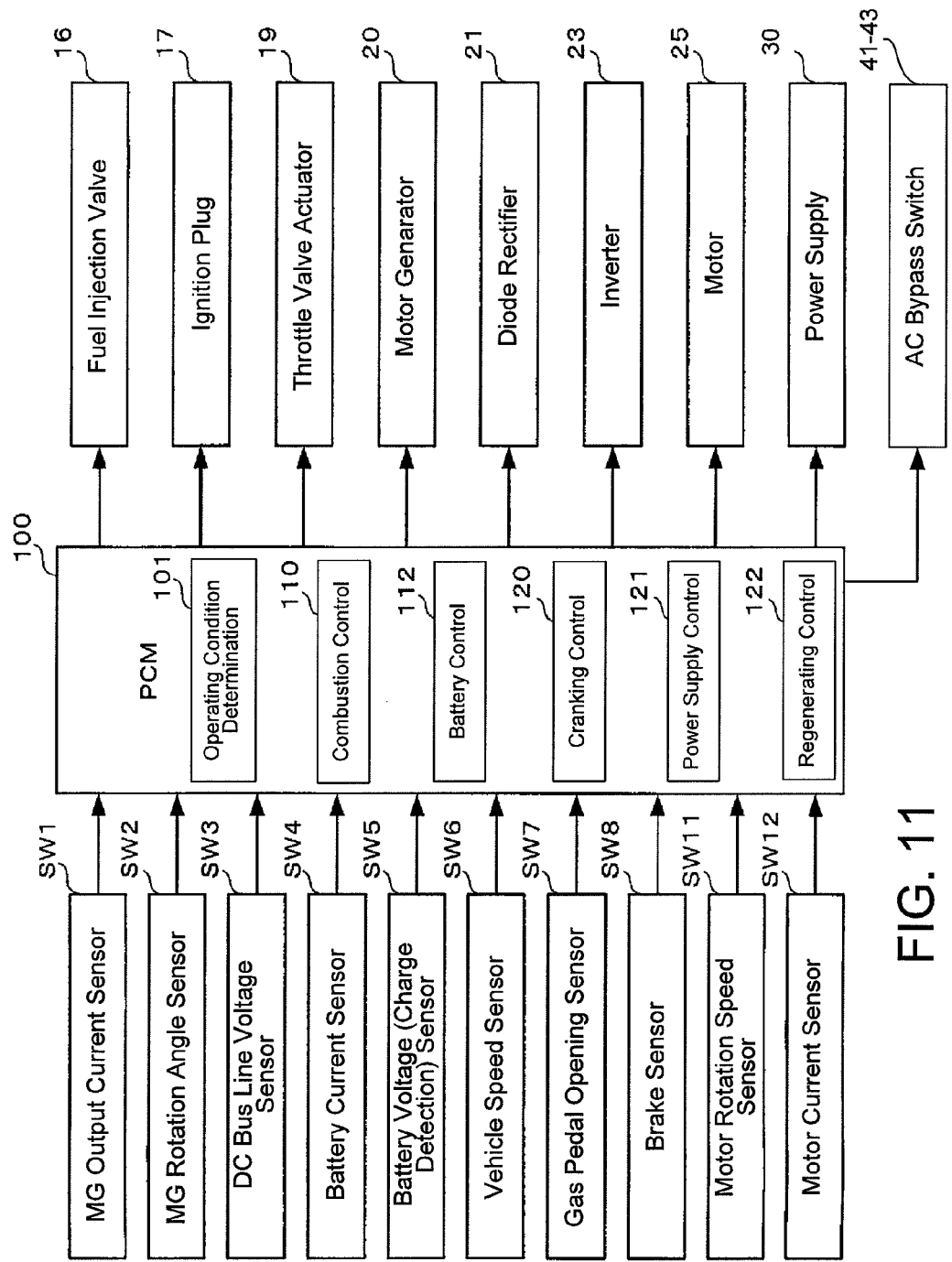
FIG. 11 is a block diagram showing a schematic configuration of the hybrid electric vehicle shown in FIG. 9.

Referring to FIG. 11, the control unit 100 of the hybrid electric vehicle shown in FIG. 9 is connected to a motor current sensor SW12 as an input element in order to control the operating condition, the power feeding method, etc. of the motor 25, as well as a motor rotation speed sensor SW11 provided in the motor 25.

Output elements of the control unit 100 includes fuel-injection valve(s) 16, spark plug(s) 17, a throttle valve actuator 19, a generator 20, a diode rectifier 21, and an inverter 23, as well as AC bypass switches 41-43.

In this embodiment of FIG. 9, the operating condition determining module 101 may be included within the control unit 100 that determines that cranking of the engine 10 by the generator 20. A data map obtained by experiments for determining that the cranking is required is stored in a memory of the control unit 100. Using the data map, the determination that cranking is required can be performed by a known method based on output values of the vehicle speed sensor SW6, the gas-pedal opening sensor SW7, the brake sensor SW8, and the battery voltage sensor SW5.

Further, in this embodiment of FIG. 9, the control unit 100 may include a cranking control module 120, a power-supply control module 121, and a regenerating control module 122.

The cranking control module 120 is a logical module that manages a control for starting the engine 10 using the generator 20. In this embodiment, the cranking control module 120 also manages a current value in the case of cranking operation of the engine 10 by the generator 20 or in the case of supplying power to the generator 20, or a switching control by the inverter 23 and the AC bypass switches 41-43. Thus, the cranking control module 120 is configured so that it can convert direct current supplied from the power supply 30 into single-phase alternating current with the inverter 23, pass the direct current to the AC bypass switches 41-43 as it is, and convert the current flowing through the bypass circuit 40 into three-phase alternating current with the AC bypass switches 41-43.

The electric supply control module 121 is a logical module that manages a control to drive the motor 25 using the generator 20. In this embodiment, the power-supply control module 121 also manages a current value at the time of supplying power to the motor 25 from the generator 20, or a switching control by the inverter 23 and the AC bypass switches 41-43. Thus, the electric supply control module 121 is configured so that it can convert alternating current supplied from the generator 20 into alternating current suitable for a torque output of the motor 25 with the diode rectifier 21 and the inverter 23, pass the direct current to the AC bypass switches 41-43 as it is, and convert the current flowing through the bypass circuit 40 into three-phase alternating current with the AC bypass switches 41-43.

The regeneration control module 122 is a logical module that manages a control to regenerate power supply 30 with current generated by the motor 25 at the time of a vehicle slowdown. In this embodiment, the regenerating control module 122 also manages a calculation of a current value at the time of generating by the motor 25, or a switching control by the diode rectifier 21, the inverter 23 and the AC bypass switches 41-43. Thus, the regenerating control module 122 is configured so that it can supply alternating current generated by the motor 25 to the power supply 30 through the inverter 23, or supply the alternating current from the AC bypass switches 41-43 through the diode rectifier 21 to the power supply 30.

Figure 12:
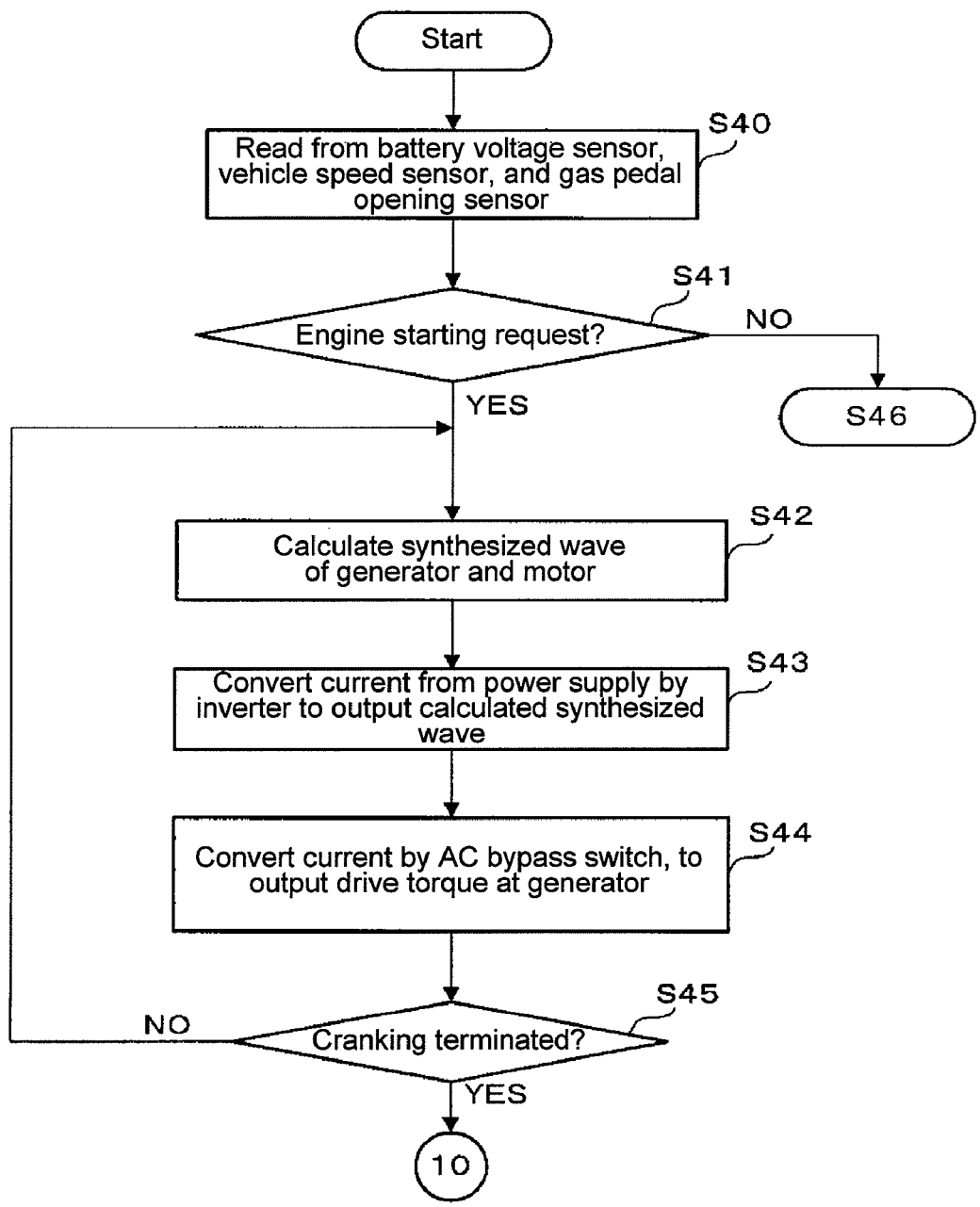
FIG. 12 is a flowchart showing an example of cranking control according to this embodiment.

FIG. 12 is a flowchart showing an example control by the modules of the control unit 100 according to this embodiment.

First, referring to FIG. 12, in the example control shown in this figure, the operating condition determining module 101 first determines a starting request of the engine 10 based on the detection signals of the input elements, such as the battery voltage sensor SW5, the vehicle speed sensor SW6, the gas-pedal opening sensor SW7, and the brake sensor SW8 (Steps S40 and S41). More specifically, in a case that the vehicle is operated within a high or middle torque operating range when a brake pedal is not pressed down but a gas pedal is pressed down, the determining module 101 determines that there is a starting request of the engine 10. When the starting request of the engine 10 is not detected, it proceeds to Step S46 (see FIG. 13), as described later.

When it is determined that there is a starting request of the engine 10, the cranking control module 120 of the control unit 100 performs a control to supply power to both of the generator 20 and the motor 25. More specifically, the cranking control module 120 calculates a synthetic wave of a three-phase AC required for driving the generator 20, and a three-phase AC required for driving the motor 25 (Step S42), and causes the inverter 23 to convert the direct current supplied from the power supply 30 so that the calculated synthetic wave is outputted (Step S43). Thus, the motor 25 is driven by an alternating current component for driving the motor 25 of the synthetic wave. Further, the cranking control module 120 of the control unit 100 controls the AC bypass switches 41-43 so that the synthetic wave is converted into three-phase AC suitable for driving the generator 20. As a result, the generator 20 is also driven by a suitable current and, thus, it performs cranking of the engine 10 (Step S44). Then, the cranking control module 120 determines whether the cranking is terminated or not (Step S45), and when it is determined that the cranking is not terminated, the process proceeds back to Step S42 to repeat the processes described above. Then, similar to the embodiment of FIG. 1, for example, when the rotation speed Ne of the generator 20 reaches greater than the starting termination speed N2, the cranking operation is terminated.

Figure 13:
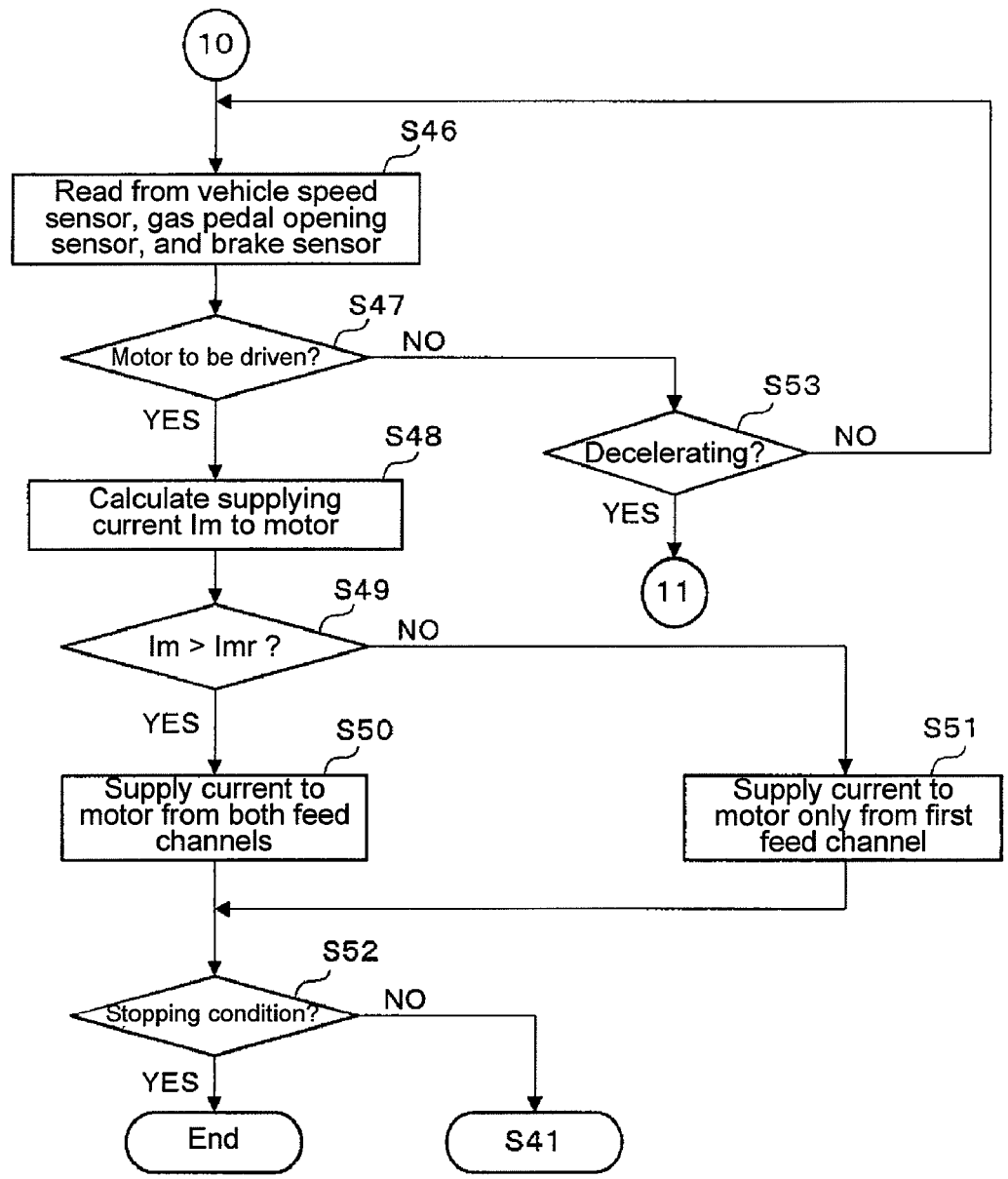
FIG. 13 is a flowchart showing an example of power-supply control according to this embodiment.

Next, as shown in FIG. 13, after the cranking operation is terminated, it proceeds to so-called "normal operation control" as shown in Step S46 and processes after this step.

In the normal operation control in Step S46 and processes after this step, the operating condition determining module 101 reads the detection signals of the vehicle speed sensor SW6, the gas-pedal opening sensor SW7, and the brake sensor SW8 (Step S46), and then determines whether it is in an operating range where the drive of the motor 25 is required based on the detection signals of these sensors SW6-SW8 (Step S47).

If it is in an operating range where the drive of the motor 25 is required, the power-supply control module 121 as a current calculating module in this embodiment calculates a supplying current Im required for the motor 25 (Step S48). Then, the operating condition determining module 101 determines whether the calculated supplying current Im is below a predetermined current Imr (Step S49). If the calculated supplying current Im is greater than the predetermined current Imr, power is supplied to the first and second feed channels to drive the motor 25 (Step S50). On the other hand, if the supplying current Im is below the predetermined current, the inverter 23 and the AC bypass switches 41-43 are controlled to supply current to the motor 25 only using one of the feed channels (Step S51). In this embodiment, the current from the generator 20 is supplied to the motor 25 through the first feed channel (including the diode rectifier 21 and the inverter 23) when executing Step S51. However, by providing a diagnostic function for each module in the control unit 100, if it is determined that the diode rectifier 21 and the inverter 23 constituting the first feed channel have failures, current is supplied from the generator 20 through the second feed channel (including the bypass circuit 40) to the motor 25.

After any one of Steps S50 and S51 is performed, it is determined that the vehicle stopping condition (a condition for determining a stop of the vehicle that is determined by the detection of change in the vehicle traveling speed, or a pressing-down of the brake) is satisfied (Step S52). If the vehicle stopping condition is satisfied, the process is then terminated. On the other hand, if the condition is not satisfied, the process returns to Step S41 (see FIG. 12) to repeat the process.

Further, if it is determined that a motor drive is not required at Step S47, the operating condition determining module 101 then determines whether the vehicle is slowing down or decelerating based on the detection signal of the vehicle speed sensor SW6 or the brake sensor SW8 (Step S53). If the vehicle is slowing down, the process proceeds to the steps for the regenerating process shown in FIG. 14. On the other hand, if the vehicle is not slowing down, the process returns to Step S46 to repeat the process.

Figure 14:
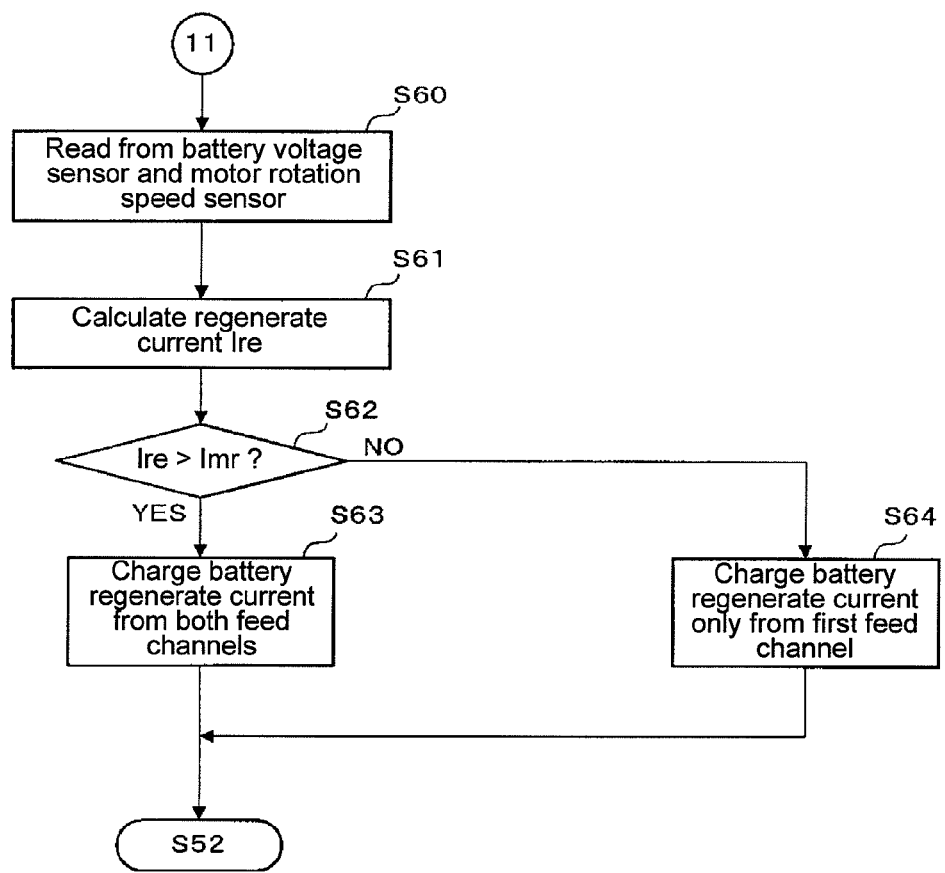
FIG. 14 is a flowchart showing an example of regenerating control according to this embodiment.

Next, if it is determined that vehicle is slowing down by the determination at Step S53, then, referring to FIG. 14, the operating condition determining module 101 reads the detection signals of the battery voltage sensor SW5 and the motor rotation speed sensor SW11 (Step S60). In this embodiment, the regenerating control module 122 as a current calculating module calculates a regenerating current Ire to be generated by the motor 25 based on the detection signals of these sensors SW5 and SW11 (Step S61). Then, the operating condition determining module 101 determines whether the calculated regenerating current Ire is below the predetermined current Imr (Step S62). If the regenerating current Ire calculated is greater than the predetermined current Imr, the power supply 30 is charged with the regenerating current Ire of the motor 25 by both the inverters 23 and 24 (Step S63). On the other hand, if the regenerating current Ire is below the predetermined current, only the inverter 23 charges the power supply 30 with the regenerating current of the motor 25 (Step S64). When any one of Steps S63 and S64 is performed, the battery control module 112 causes a DC-DC converter (not shown) to perform a step-down operation similar to the previous embodiment of FIG. 1 to control so that current flows from the DC bus line 22 into the power supply 30.

When Step S63 is performed and regenerating of the power supply 30 is performed through the first and second feed channels, a portion of the current generated by the motor 25 is supplied to the power supply 30 through the inverter 23, while the remaining current is supplied from the AC bypass switches 41-43 through the diode rectifier 21 to the power supply 30. Thus, overload of the inverter 23 can be effectively inhibited, and heat generation or deterioration of the inverter associated therewith can be avoided.

Further, when one of the feed channels is selected, similar to the case of the power-supply control of the motor 25, it is preferable to supply current from the motor 25 to the power supply 30 through the inverter 23. However, when it is determined that the inverter 23 has failure, the current of the motor 25 may be supplied to the power supply 30 from the second feed channel (including the bypass circuit 40) through the diode rectifier 21.

After any one of Steps S63 and S64 is performed, the control proceeds to Step S52 (see FIG. 13) to repeat the processes described above.

In this embodiment, the generator 20 and the motor 25 are multiphase alternating-current rotating machines, the rectifier is the diode rectifier 21, and the alternating-current converters are the AC bypass switches 41-43 as semiconductor switches provided for each phase of the generator 20 and the motor 25. Thus, in this embodiment, because the diode rectifier 21 is adopted as the rectifier, conversion efficiency can be improved, and loss of a power generation system can be significantly reduced compared with the case where the converter is constituted with the inverter 23. Further, because the semiconductor switches are provided as the alternating-current converters for each phase of the generator 20 or the motor 25 that is constituted with the multiphase alternating-current rotating machine, the power-supply control can be achieved with a simple circuit configuration by selectively using one of feed channels at the time of the power supply by the generator 20 and the regeneration by the motor 25.

Also in this embodiment provided with the bypass circuits 40 described above, various modification may be possible, such as the following embodiment.

Fourth Embodiment

Figure 15:
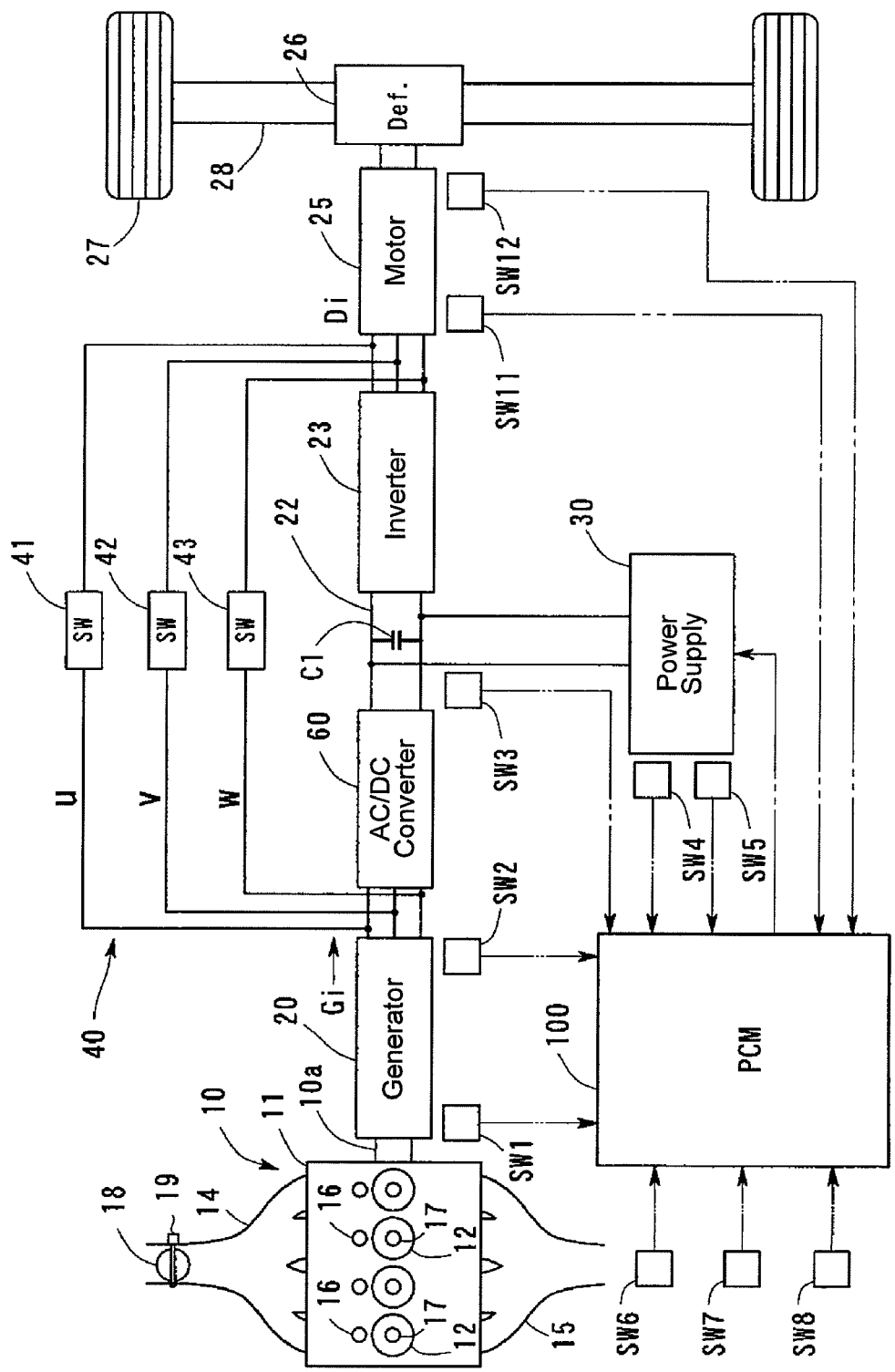
FIG. 15 is a schematic block diagram of the hybrid electric vehicle according to another embodiment of the invention.

FIG. 15 is a schematic block diagram of a hybrid electric vehicle according to another embodiment of the invention. For example, as shown in FIG. 15, an AC-DC converter 60 constituted with an inverter may be adopted as a rectifier.

In the above embodiments, the predetermined current Imr may be set so that it has a predetermined factor of safety to the rated current Ir. In this case, overload of the inverter can certainly be avoided.

The above embodiments are only illustrations of preferable examples of the present invention and, thus, the invention is not limited thereto. It should be appreciated by those skilled in the art that various changes are possible within the scope of the appended claims.

As described above, according to the present invention, when supplying power to the motor 25, or when the motor 25 generates power, a current to be supplied is calculated, and one of the first and second feed channels is selected based on the calculated current, thereby the optimum selection of the feed channels can be achieved based on an operating condition. Therefore, it is possible to improve an operation rate of the inverter 23 and, thus, to improve efficiency of the inverter 23. Contrary, reducing the operation rate of the inverter 23 may avoid the overload of the inverter 23, and thereby preventing heat generation, and deterioration of the inverter associated therewith.

Further, in the above embodiments, the first feed channel is a power-supply path passing through the inverter 23. Further, in the embodiment of FIGS. 1-8, the second feed channel is a power-supply path passing through the second inverter 24, and in this embodiment of FIG. 9, it is the bypass circuit 40.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A control system for a hybrid electric vehicle, the hybrid electric vehicle including a generator driven by an engine to generate alternating current;
 a motor configured to provide a drive force to propel the vehicle and configured as a generator to regenerate energy during vehicle deceleration,
 a rectifier to rectify alternating current generated by the generator,
 an inverter connected to a feed circuit between the rectifier and the motor to convert direct current in the feed circuit into alternating current,
 a power supply connected to a line connecting the rectifier with the inverter;
 a first feed circuit to supply a current to the motor via the inverter,
 a second feed circuit to supply a current to the motor while bypassing the inverter,
 wherein the second feed circuit includes an alternating current converter, the control system comprising:
 a current calculating module to calculate a current, the current being at least one of a current to drive the motor and a current generated by the motor; and
 a feed controller to selectively implement a first mode when the calculated current is below a predetermined current value and to selectively implement a second mode when the calculated current is more than the predetermined current value,
 wherein either the first feed circuit or the second feed circuit is used in the first mode and both the first feed circuit and the second feed circuit are used in the second mode.

2. The control system for a hybrid electric vehicle according to claim 1,
 wherein the generator is a polyphase generator and the motor is a polyphase motor,
 wherein the rectifier is a diode rectifier, and
 wherein the alternating current converter is a plurality of semiconductor switches that are provided for each phase for the polyphase generator and the polyphase motor.

3. The control system for a hybrid electric vehicle according to claim 1,
 wherein the alternating current converter is a second inverter.

4. The control system for a hybrid electric vehicle according to claim 3,
 wherein both of the first inverter and the second inverter have a similar rated current, and
 wherein the feed controller activates either the first or second inverter when the calculated current is below the predetermined current value.

5. The control system for a hybrid electric vehicle according to claim 3,
 wherein the feed controller is configured to activate one of the first and second inverter, and is further configured to activate the other of the first and second inverter when it is determined that only one of the inverters is activated and a temperature of the activated inverter is above a predetermined temperature.

6. The control system for a hybrid electric vehicle according to claim 3,
 wherein the generator is further configured to start the engine,
 the control system further comprising:
 a switching device to selectively switch between a motor power feed mode if the power supply is connected to the motor via the second inverter and a starter power feed mode if the power supply is connected to the generator via the second inverter, and
 a controller to switch the switching device such that the starter power feed mode is selected to start the engine.

7. A method for controlling a hybrid electric vehicle having a generator driven by an engine to generate alternating current, a motor configured to provide a drive force to propel the vehicle and configured as a generator to regenerate energy during vehicle deceleration, a rectifier to rectify alternating current generated by the generator, an inverter connected to a feed circuit between the rectifier and the motor and to convert direct current in the feed circuit into alternating current, a power supply connected to a line connecting the rectifier with the inverter, a first feed circuit to supply a current to the motor via the inverter, a second feed circuit to supply a current to the motor while bypassing at least the inverter, and an alternating current converter provided in the second feed circuit, the method comprising:

calculating a current, wherein the current is at least one of a current to drive the motor and a current generated by the motor;

activating one of the first and second feed circuits when the calculated current is below a predetermined current value; and activating both the first and second circuits when the calculated current is more than the predetermined current value.

8. The method for controlling a hybrid electric vehicle according to claim 7, wherein the generator is a polyphase generator and the motor is a polyphase motor, wherein the rectifier is a diode rectifier, and wherein the alternating current converter is a plurality of semiconductor switches that are provided for each phase for the polyphase generator and the polyphase motor.

9. The method for controlling a hybrid electric vehicle according to claim 7, wherein the alternating current converter is a second inverter.

10. The method for controlling a hybrid electric vehicle according to claim 9, wherein both of the first inverter and the second inverter have a similar rated current, the method further comprising:

controlling feed current to activate either the first inverter or the second inverter when the calculated current is below the predetermined current value.

11. The method for controlling a hybrid electric vehicle according to claim 9, further comprising:

controlling feed current to activate one of the first and second inverters, and activating the other of the first and second inverters when it is decided that only one of the inverters is activated and a temperature of the activated inverter is above predetermined temperature.

12. The method for controlling a hybrid electric vehicle according to claim 9, wherein the generator is further configured to start the engine, and wherein the hybrid electric vehicle includes a switching device for selectively switching between a motor power feed mode if the power supply is connected to the motor via the second inverter and a starter power feed mode if the power supply is connected to the generator via the second inverter, and the method further comprising:

switching the switching device such that the starter power feed mode is selected to start the engine.

* * * * *